(12) United States Patent
Wang et al.

(10) Patent No.: US 10,243,702 B2
(45) Date of Patent: Mar. 26, 2019

(54) METHOD AND BS FOR SCHEDULING UE AND METHOD AND UE FOR TRANSMITTING HARQ

(71) Applicant: Telefonaktiebolaget LM Ericsson (publ), Stockholm (SE)

(72) Inventors: Jun Wang, Jiangsu (CN); Yong Yao, Jiangsu (CN); Yingde Liu, Jiangsu (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/529,755

(22) PCT Filed: Dec. 5, 2014

(86) PCT No.: PCT/CN2014/093120
§ 371 (c)(1),
(2) Date: May 25, 2017

(87) PCT Pub. No.: WO2016/086405
PCT Pub. Date: Jun. 9, 2016

(65) Prior Publication Data
US 2017/0310429 A1    Oct. 26, 2017

(51) Int. Cl.
*H04L 1/18* (2006.01)
*H04W 72/04* (2009.01)
*H04W 72/12* (2009.01)

(52) U.S. Cl.
CPC .......... *H04L 1/1854* (2013.01); *H04L 1/1861* (2013.01); *H04L 1/1864* (2013.01);
(Continued)

(58) Field of Classification Search
CPC .................. H04W 72/0413; H04L 5/0055
See application file for complete search history.

(56) References Cited

U.S. PATENT DOCUMENTS

| | | | |
|---|---|---|---|
| 2012/0082113 A1* | 4/2012 | Lee | H04L 1/1861 370/329 |
| 2012/0275400 A1 | 11/2012 | Chen et al. | |
| 2014/0198737 A1 | 7/2014 | Papasakellariou | |

FOREIGN PATENT DOCUMENTS

| | | |
|---|---|---|
| CN | 101702644 | 5/2010 |
| CN | 102196570 | 9/2011 |

(Continued)

OTHER PUBLICATIONS

Supplementary European Search Report for Application No./Patent No. 14907270.4-1875/3228149 PCT/CN2014093120—dated Nov. 10, 2017.

(Continued)

*Primary Examiner* — Kevin C. Harper
(74) *Attorney, Agent, or Firm* — Baker Botts, LLP

(57) ABSTRACT

A method used in a BS for scheduling a UE, and an associated BS is disclosed. The method includes: allocating one or more DL Resource Blocks (RBs) for transmitting DownLink (DL) data to the UE (S910); determining an UpLink (UL) control channel position for the UE transmitting a Hybrid Automatic Repeat Request (HARQ) feedback of the DL data, based on the allocated one or more DL RBs (S920); and transmitting the DL data to the UE by using the allocated one or more DL RBs (S930). Said method also related to a method used in a UE for transmitting a HARQ feedback, and an associated UE.

17 Claims, 9 Drawing Sheets

(52) U.S. Cl.
CPC .......... *H04L 1/1887* (2013.01); *H04L 1/1893* (2013.01); *H04L 1/1896* (2013.01); *H04W 72/0413* (2013.01); *H04W 72/1273* (2013.01); *H04W 72/1284* (2013.01)

(56) References Cited

FOREIGN PATENT DOCUMENTS

| CN | 102932921 | 2/2013 |
|----|-----------|--------|
| WO | 2010 050704 A2 | 5/2010 |
| WO | 2010 050704 A3 | 5/2010 |
| WO | 2014 185850 A1 | 11/2014 |

OTHER PUBLICATIONS

PCT Notification of Transmittal of the International Search Report and the Written Opinion of the International Searching Authority, or the Declaration ofr International application No. PCT/CN2014/093120—dated Aug. 25, 2015.

* cited by examiner

METHOD AND BS FOR SCHEDULING UE AND METHOD AND UE FOR TRANSMITTING HARQ

PRIORITY

This nonprovisional application is a U.S. National Stage Filing under 35 U.S.C. § 371 of International Patent Application Serial No. PCT/CN2014/093120 filed Dec. 5, 2014, and entitled "Method and BS for Scheduling UE and Method and UE for Transmitting HARQ."

TECHNICAL FIELD

The technology presented in this disclosure generally relates to radio communication networks. More particularly, the present disclosure relates to a method used in a Base Station (BS) for scheduling a User Equipment (UE) and an associated BS, and to a method used in a UE for transmitting a Hybrid Automatic Repeat Request (HARQ) feedback to a BS and an associated UE.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Usually, there are two kinds of scheduling schemes (also referred to as HARQ index allocation), dynamical scheduling and Semi-Persistent Scheduling (SPS).

A HARQ feedback (ACK/NACK) position (e.g., indicated by a Physical Uplink Control CHannel (PUCCH) HARQ index) for dynamical scheduling is derived according to Control Channel Element (CCE) index. For example, providing one to one mapping relationship between PUCCH HARQ indices and CCEs, a PUCCH HARQ index may be calculated based on a CCE start index of Downlink Control Information (DCI) in Physical Downlink Control CHannel (PDCCH), i.e., PUCCH HARQ Index=mapping_func (CCE start index).

For SPS, due to no DCI indication, HARQ feedback position of DownLink (DL) periodical data can't be derived from its CCE index like the dynamic scheduling does. So, the 3GPP specifies that a BS needs to statically allocate up to 4 candidate positions in a Radio Resource Control (RRC) message, from which a specific one is chosen and indicated to the UE via 2 bits Transmit Power Control (TPC) field in DL DCI at SPS (re)activation. That is, SPS has statically allocated HARQ index for HARQ feedback position of DL periodical data.

Due to coexistence of the different HARQ index allocation methods, there is high probability of HARQ index confliction between dynamic scheduling and SPS. For example, the dynamically scheduled UE's HARQ index derived from its CCE index happens to hit the statically allocated one for SPS UE, especially under heavy load. In such a case, either the dynamically scheduled UE is postponed to next System Frame (SF) or SPS UE moves to another HARQ index within the at most 4 candidates. However, regardless of which option is chosen, the flexibility will be impacted and extra overhead (e.g., Downlink Control Information (DCI) signaling) is added.

Although there exist some workarounds to avoid such potential confliction between dynamic scheduling and SPS, such workarounds all introduce side effect. For example, allocation of one more area in PUCCH format 1 dedicated for SPS HARQ feedback without overlapping with that for dynamic part, however, need consume extra PUCCH resources.

Moreover, there is one-to-one mapping between CCEs and PUCCH HARQ indices. Considering the number of scheduled UEs per Transmission Time Interval (TTI) is much smaller than the maximum number of CCEs, the HARQ index allocation is actually very sparse in PUCCH format 1a/1b area. This results in low PUCCH resource usage efficiency. In a future evolution version such as the $5^{th}$ Generation (5G), the inefficiency may become worse due to the wider frequency spectrum (e.g., 100 M in 5G), shorter TTI (e.g., 200 us in 5G) as well as larger capacity.

SUMMARY

It is in view of the above considerations and others that the various embodiments of the present technology have been made. To be specific, aiming to at least some of the above defects, the present disclosure proposes a unified HARQ allocation method, which indicates a HARQ feedback (ACK/NACK) position (e.g., a PUCCH HARQ index) by using a Resource Block (RB) index instead of a CCE index.

According to a first aspect of the present disclosure, there is proposed a method used in a BS for scheduling a UE. The method includes steps of: allocating one or more DL RBs for transmitting DL data to the UE; determining an UL control channel position for the UE transmitting a HARQ feedback of the DL data, based on the allocated one or more DL RBs; and transmitting the DL data to the UE by using the allocated one or more DL RBs.

According to a second aspect of the present disclosure, there is proposed a method used in a UE for transmitting a HARQ feedback. The method includes steps of: receiving DL data from a BS; determining an UL control channel position for transmitting the HARQ feedback based on one or more DL RBs allocated to the UE; and transmitting the HARQ feedback on the determined UL control channel position.

According to a third aspect of the present disclosure, there is proposed a BS for scheduling a UE. The BS includes: an allocating unit configured to allocate one or more DL RBs for transmitting DL data to the UE; a determining unit configured to determine an UL control channel position for the UE transmitting a HARQ feedback of the DL data, based on the allocated one or more DL RBs; and a transmitting unit configured to transmit the DL data to the UE by using the allocated one or more DL RBs.

According to a fourth aspect of the present disclosure, there is proposed a UE for transmitting a HARQ feedback. The UE includes: a receiving unit configured to receive DL data from a BS; a determining unit configured to determine an UL control channel position for transmitting the HARQ feedback based on one or more DL RBs allocated to the UE; and a transmitting unit configured to transmit the HARQ feedback on the determined UL control channel position.

According to a fifth aspect of the present disclosure, there is proposed a computer program product storing instructions that when executed, cause one or more computing devices to perform the method according to any of the first and second aspects of the present disclosure.

By indicating an UL control channel position for the UE transmitting a HARQ feedback of the DL data (e.g., a PUCCH HARQ feedback index) by using the allocated one or more DL RBs, the present disclosure can eliminate HARQ index confliction between dynamic scheduling and SPS, while improving PUCCH resource usage efficiency.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
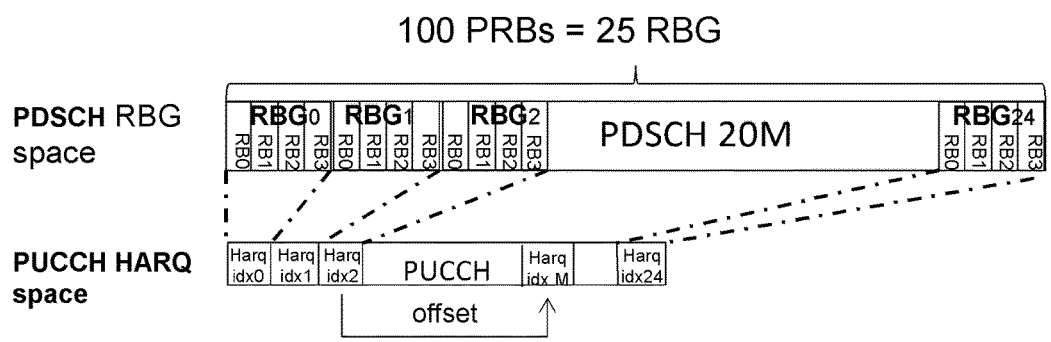
FIG. 1 illustrates an example of PUCCH HARQ index mapping from Physical Downlink Sharing CHannel (PDSCH) RBG according to the present disclosure.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, a PDA, a portal computer etc. Yet further, the term UE includes MTC (Machine Type Communication) devices, which do not necessarily involve human interaction. Also, the term "BS" as used herein may be referred to as a radio base station, a NodeB or an evolved NodeB (eNB), access point, relay node, etcetera.

As used hereinafter, it should be appreciated that the term RB may be referred to a Physical Resource Block (PRB) in terms of time domain and frequency domain for transmitting data. Moreover, the term RB may be also referred to a Virtual Resource Block (VRB), which corresponds to a PRB. The correspondence between PRB and VRB helps to represent PRBs in a continuous way even if the PRBs are not continuous. In addition to PRB and VRB, the term RB includes any resource block, which may be used for transmitting data.

The present disclosure proposes to use a RB index to indicate a HARQ feedback position. As an implementation, instead of an index of a single RB, a Resource Block Group (RBG) formed by one or more RBs may be used as a basic granularity of mapping a HARQ feedback position. That is, a HARQ feedback position may be mapped to one or more RBGs. A RBG size (i.e., the number of RBs forming the RBG) and capacity vary according to spectrum bandwidth like following table.

| System bandwidth | RBG size ($P_{RBG}$) | RBG capacity |
| --- | --- | --- |
| <=10 | 1 | <=10 |
| 11-26 | 2 | 6-13 |
| 27-63 | 3 | 9-21 |
| 63-100 | 4 | 16-25 |

In a future evolution version with wider frequency spectrum (e.g., 100 M), the RBG size may be increased accordingly, but the RBG is still used as the minimum granularity of HARQ index mapping input.

FIG. 1 illustrates an example of PUCCH HARQ index mapping from PDSCH RBG (100 RBs) according to the present disclosure. As shown in FIG. 1, a HARQ feedback position may be indicated with a granularity of one or more RBGs. For example, 'Harq idx0' is mapped to RBG0 formed by RB0-RB3. That is, a HARQ feedback of DL data transmitted over RB0-RB3 is to be transmitted in a PUCCH resource indexed as 'Harq idx0'.

The present disclosure generally proposes a formula for mapping between a HARQ feedback position and a RB index with a granularity of RBG, as shown in formula (1):

$$HARQ_{idx} = \left\lfloor \frac{RB_{idx}}{P_{RBG}} \right\rfloor \times K + \text{offset}$$

wherein, $HARQ_{idx}$ indicates an index of the UL control channel position;

$P_{RBG}$ represents the number of RBs forming a RBG, for example $P_{RBG}$ is 4 for 100 M frequency spectrum, but may be larger in future evolution versions;

$RB_{idx}$ indicates an index of a RB in the one or more DL RBs allocated to the UE;

⌊*⌋ represents a floor operator;
K is the number of UL control channel positions corresponding to one RBG; for SORTD mode, K is 2, but it may be larger in further evolution versions; and
offset denotes an offset of $HARQ_{idx}$.

By default, one RBG is mapped to one HARQ index, i.e., K=1. But one RBG may be also mapped to 2 HARQ indices (i.e., K=2) to handle SORTD mode UE in Release 10+or backward compatibility with legacy HARQ index mapping, where HARQ indices N and N+1 correspond to a single RBG.

$RB_{idx}$ and offset may vary depending on a DL RB resource allocation scheme used for the DL data.

Currently, there are 3 types of DL RB resource allocation schemes: Resource Allocation Type 0 (Type 0 for simplicity), Resource Allocation Type 1 (Type 1 for simplicity), and Resource Allocation Type 2 (Type 2 for simplicity).

Type 0

For Type 0, RBs are allocated with a granularity of a RBG. That is, the UE is assigned with DL RB resource in a unit of one or more RBGs. Then, $RB_{idx}$ is an index of a first RB in the allocated RBs, and offset is zero. In this case, the BS may only inform the UE of Type 0 via DCI without signalling additional information in DCI.

Usually, there is a field of 25 bits in DCI for Type 0, taking 100 RBs as example. Each bit corresponds to one RBG. For example, '1' represents that a corresponding RBG is allocated to the UE for transmitting DL data, and '0' represents that a corresponding RBG is not allocated to the UE.

Figure 2:
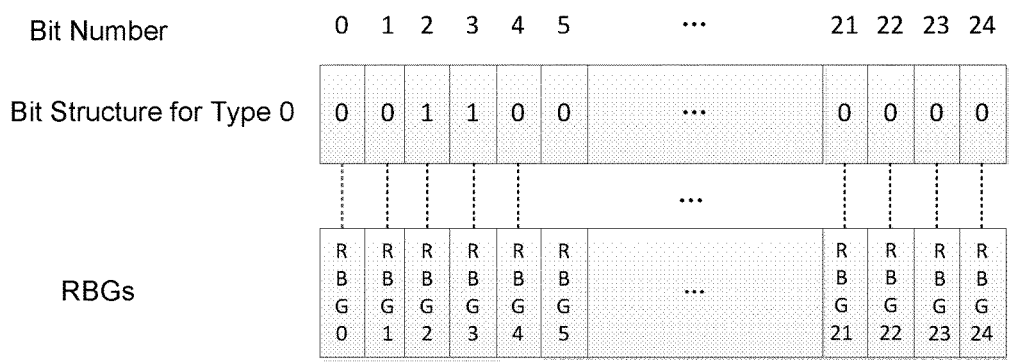
FIG. 2 illustrates an example bit structure for Type 0 according to the present disclosure.

FIG. 2 illustrates an example bit structure for Type 0 according to the present disclosure. As shown in FIG. 2, bit 2 and bit 3 are '1', which means that RBG2 and RBG 3 are allocated to the UE for transmitting DL data. In this case, an index of a first RB in RBG 2 and RBG 3 (i.e., RB 8) is taken as $RB_{idx}$.

Type 1

For Type 1, all DL RBs are divided into more than one subsets at a granularity of RBG, and the UE is only assigned with one or more RBs within one subset.

Figure 3:
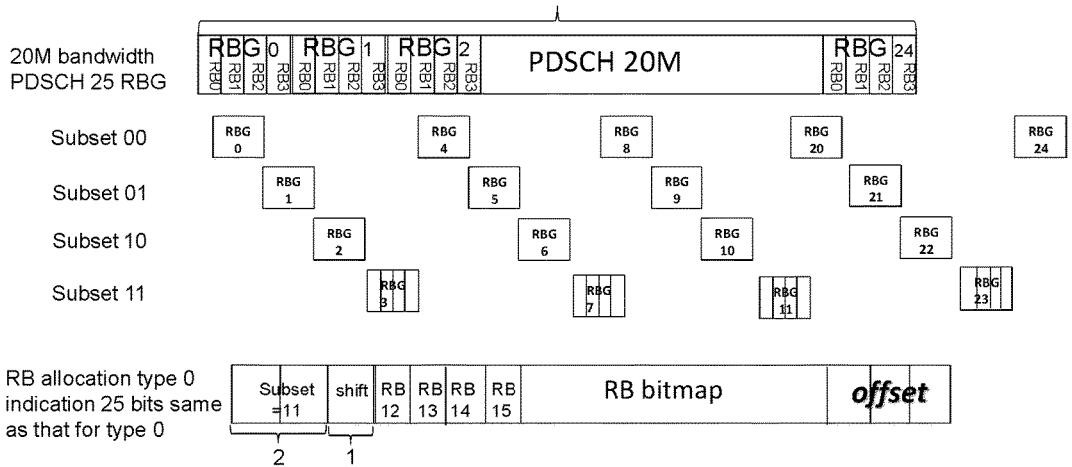
FIG. 3 illustrates an example arrangement in DCI for Type 1 according to the present disclosure.

FIG. 3 illustrates an example arrangement in DCI for Type 1 according to the present disclosure. As shown in FIG. 3, considering 100 DL RBs in total, the 100 DL RBs are divided into 4 subsets at a granularity of RBG equally, i.e., subset 0, subset 1, subset 2 and subset 3. So, each subset has ¼ of RBGs, i.e., at least 6 RBGs, total 24 RBs. The exception is subset 00, which includes 7 RBGs, 28 RBs in total. It should be appreciated that 100 DL RBs is just an example for illustration, and any other number of DL RBs, which depend on, e.g., system capability, etc., may be applicable to the present disclosure. Similarly, any number of subsets other than 4 may be applicable to the present disclosure.

Type 1 has the same bit size as type 0 (i.e. a field of 25 bits in DCI), but a different bit structure. FIG. 3 further illustrates an example bit structure for Type 1.

As shown in FIG. 3, the example bit structure has three parts as follows:
a 2-bit subset index, which indicates a specific subset out of the above 4 subsets, e.g., 00, 01, 10, and 11 indicate subsets 0, 1, 2, and 3, respectively;
a 1-bit shift, which indicates a starting point within a corresponding subset; and
a 22-bit field, which indicates which RBs within a corresponding subset are allocated to the UE.

In this example, the 2-bit subset index in this example is 11, as shown in FIG. 3, which refers to subset 3. That is, only one or more RBs within subset 3 are to be allocated to the UE.

When 1-bit shift=0, this means that the starting point is at the first RB within the allocated subset. In the example as shown in FIG. 3, the starting point is at RB 12 in RBG 3 within subset 11. In this case, since there are only 22 bits available, the 22-bit field may only cover RBs 12-15, 28-31 . . . 92-93 within subset 11, and RBs 94-95 have to be ignored. That is, RBs 94-95 are not to be allocated to the UE.

When 1-bit shift=1, the starting point is moved forward 2 indices (for subset 11, from RB 14). So, the 22 bit-field can cover RBs at high end, i.e., RBs 14-15, 28-31 . . . 92-96 within subset 11, and RBs 12-13 have to be ignored. That is, RBs 12-13 are not to be allocated to the UE.

Each bit in the 22-bit field corresponds to one RB. For example, '1' represents that a corresponding RB is allocated to the UE for transmitting DL data, and '0' represents that a corresponding RB is not allocated to the UE. That is, it can be seen from the 22-bit field that which RB(s) are allocated to the UE.

If the number of RBs allocated to the UE is larger than or equal to $P_{RBG}$ (i.e., ≥4 in this example), there is one RB, which stays at a boundary of a RBG, allocated to the UE. Then, an index of a first RB among the one or more DL RBs allocated to the UE with indices as integer times of $P_{RBG}$ stands for $RB_{idx}$, and offset is zero.

If the number of RBs allocated to the UE is smaller than $P_{RBG}$ (i.e., <4 in this example), there are at most $P_{RBG}$ numbers of "1" in the former 19 bits in the 22-bit field, and the remaining 3 bits in the 22-bit field are reserved as offset bits for carrying offset, as shown in FIG. 3. Then, an index of a first RB among the one or more DL RBs allocated to the UE stands for $RB_{idx}$, and offset is indicated by the highest 3 bits in the 22-bit field. It should be appreciated that reserving the highest 3 bits in the 22-bit field is just an example for illustration, and reserving any other number of bits may be applicable to the present disclosure.

An exemplary case will be described by using the bit structure as shown in FIG. 3. To be specific, if the BS allocates RBs 14, 15 and 25 within subset 3 to the UE for transmitting DL data, corresponding bits in the 22-bit field should be 1. This shows that the number of RBs allocated to the UE is smaller than $P_{RBG}$. In this case, RB 14 is the first RB among these three RBs allocated to the UE, so $RB_{idx}$ is 14. According to $$HARQ_{idx} = \left\lfloor \frac{RB_{idx}}{P_{RBG}} \right\rfloor \times K,$$

it may be calculated that $HARQ_{idx}$ is 3, i.e., a HARQ feedback position indexed as $HARQ_{idx3}$. However, as shown in FIG. 3, $HARQ_{idx3}$ has been allocated to RB 12. In this case, the BS adds an offset to allocate $HARQ_{idx3}$+offset to RB 14, and indicates offset by the highest 3 bits in the 22-bit field.

Type 2

For Type 2, a segment of continuous VRBs are allocated to the UE. That is, the UE is assigned with one or more continuous VRBs. Here, each VRB corresponds to a PRB, and similarly four VRBs also form a RBG. So, a VRB is also called as a RB hereinafter. It shall be noted that RBs corresponding to the continuous VRBs may be not continuous.

Figure 4:
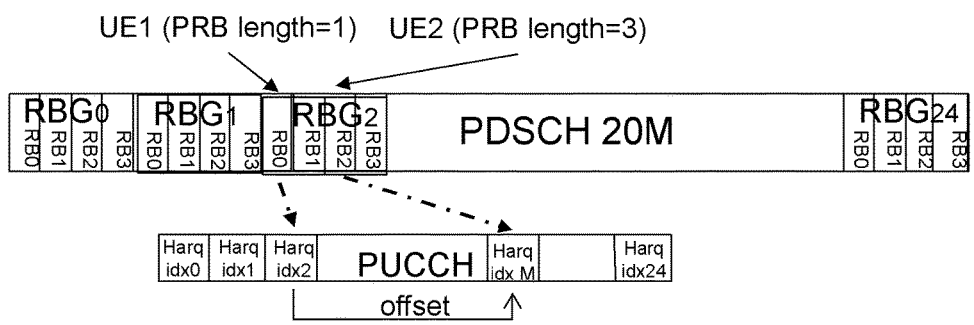
FIG. 4 illustrates an example correspondence between RBs and HRAQ feedback indices for Type 2 according to the present disclosure.

FIG. 4 illustrates an example correspondence between RBs and HRAQ feedback indices for Type 2 according to the present disclosure.

To be specific, there are two cases. If the number of VRBs (i.e., RBs) allocated to the UE is larger than or equal to $P_{RBG}$ (i.e., ≥4 in this example), there is one RB, which stays at a boundary of a RBG, allocated to the UE. Then, an index of a first RB among the one or more RBs allocated to the UE with indices as integer times of $P_{RBG}$ stands for $RB_{idx}$, and offset is zero.

If the number of RBs allocated to the UE is smaller than $P_{RBG}$ (i.e., <4 in this example), there may be no corresponding HARQ index available when there is no RB at RBG boundary as shown in FIG. 4.

For example, for UE1 acquiring one RB (index=8) at a RBG boundary, it's assigned with the corresponding HARQ index (i.e., 2) according to $$HARQ_{idx} = \left\lfloor \frac{RB_{idx}}{P_{RBG}} \right\rfloor \times K \ (K = 1).$$

But for UE2 which occupies the subsequent 3 consecutive RBs (RB9-RB11), according to $$HARQ_{idx} = \left\lfloor \frac{RB_{idx}}{P_{RBG}} \right\rfloor \times K \ (K = 1),$$

its corresponding HARQ index is still the same HARQ index (i.e., 2), which has been occupied by UE1. In this case, another idle HARQ index (M) has to be allocated and notified to UE2 through an offset.

Unlike Type 0 and Type 1, it is only needed to specify a starting point and a RB length in Type 2, which are encoded into a Resource Indicator Value (RIV) field in DCI. According to the present disclosure, the RIV field may also indicate an offset for the HARQ index.

Figure 5:
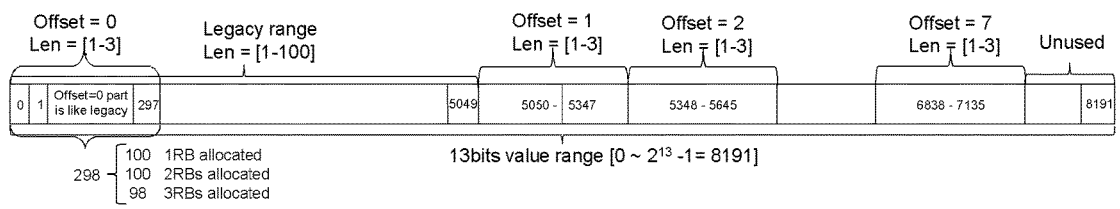
FIG. 5 illustrates how to indicate an offset by utilizing value ranges of the RIV field according to the present disclosure.

FIG. 5 illustrates how to indicate an offset by utilizing value ranges of the RIV field according to the present disclosure.

The RIV field has a size of $$L_{RIV} = \left\lceil \log_2 \frac{N_{RB}(N_{RB} + 1)}{2} \right\rceil.$$

Taking $N_{RB}$=100 as example, a valid value range of the RIV field is [0 ... 5049], so $L_{RIV}$ occupies 13 bits in the DCI. 13 bits can represents a value range of [0 ... $2^{13}$−1=8191], as shown in FIG. 5.

A value range of 0-297 is actually overlapped by existing RIV valid range, which not only represents RIV of allocated RB number (1-3)<RBG size, but also implicitly indicates offset=0.

Value ranges from 5050-5347 to 6838-7135 are all beyond existing RIV value range, each of which includes 298 values representing RIV of allocated RB number<RBG size. Upon detecting RIV falling into such ranges, UE recognizes non-ZERO offset according to following formula:

$$\text{offset} = \begin{cases} 0, & 0 \le RIV < 298 \\ NA, & 298 \le RIV < 5050 \\ \left\lfloor \frac{RIV - 5050}{298} \right\rfloor + 1, & 5050 \le RIV < 7136 \end{cases}$$

For example, RIV within range 5050-5347 indicates offset=1; 5348-5645, offset=2; . . . 6838-7135, offset=7. In this way, as long as the allocated number is below RBG size, the RIV can indicate the 3 bits offset implicitly without adding size.

An exemplary case will be described by using correspondence between different value ranges indicated by the RIV field and different offsets as shown in FIG. 5. To be specific, if the BS allocates three continuous RBs to UE 2 for transmitting DL data, and an index of the first RB is 87 (considering 100 RBs in total). According to $$HARQ_{idx} = \left\lfloor \frac{PRB_{idx}}{P_{RBG}} \right\rfloor \times K \ (K = 1),$$

it may be calculated that $HARQ_{idx}$ is 21, i.e., a HARQ feedback position indexed as $HARQ_{idx21}$. However, $HARQ_{idx21}$ has been allocated to UE 1, which has been assigned with RB 84. In this case, the BS needs to find an available HARQ feedback position for UE 2. For example, if the BS finds that $HARQ_{idx23}$ is available, then the BS may add an offset of 2 to Allocate $HARQ_{idx3}$+offset to UE 2. In this case, a value indicated by the RIV should be 5635. That is, when the RIV field indicates a value of 5635, the UE may determine that $RB_{idx}$ is 87 and offset is 2, and then may calculate $HARQ_{idx}$ as 23, according to the formula (1).

DCI 2B/2C for MU-MIMO

In most cases, one RB is dedicatedly allocated to a single UE. However, when the DCI is DCI 2B/2C for Multi-User Multi-Input Multi-Output (MU-MIMO), e.g., in DL TM8/9 MU-MIMO case, the same RB may be allocated to two UEs simultaneously.

This may result in that the two UEs are mapped to same HARQ feedback position. In this case, in addition to the first offset, a second offset is introduced into offset in formula (1).

Figure 6:
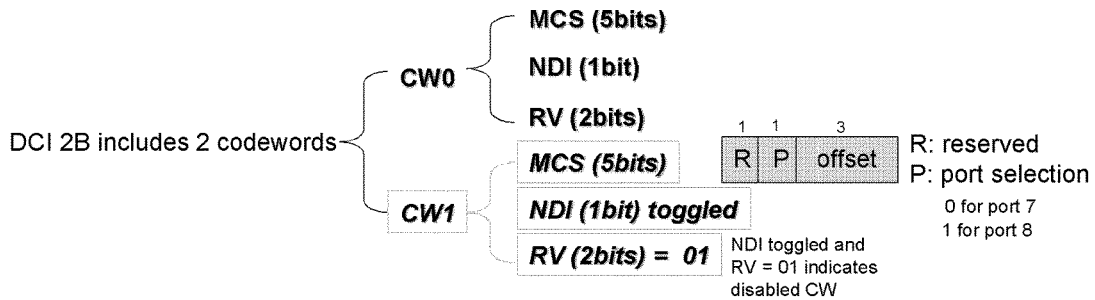
FIG. 6 illustrates an example arrangement for the second offset according to the present disclosure.

FIG. 6 illustrates an example arrangement for the second offset according to the present disclosure.

For MU-MIMO, there are usually two codewords for one UE. But, the UE only uses one codeword thereof for transmitting DL data, and the other one is not used. As shown in FIG. 6, there are two codewords, i.e., CW0 and CW1. CW0 is actually used for transmitting DL data. So, the first offset as mentioned above may be applied in CW0, and detailed thereof will be omitted here. CW1, which has toggled NDI and RV=01, is disabled, i.e., being not used for transmitting DL data. Thus, CW1's 5-bit MCS is useless, which may be set to carry the second offset. For example, the second offset may be carried by 3 bits of CW1 denoted as 'offset'.

For example, upon receiving DCI 2B/2C, the UE can detects a disabled codeword based on the toggled NDI and RV=01. Then, the UE can fetch the second offset from the disable codeword, and determine offset as equal to the first offset plus a second offset. Finally, the UL control channel position for the UE transmitting a HARQ feedback of DL data can be determined based on the formula (1).

Optimization of HARQ Index Compression

For a 20 M bandwidth, there are 25 RBGs in PDSCH, then there are at most 25 HARQ indices (K=1) per each DL SF accordingly. Assuming each UL RB can provide 18 HARQ indices, TDD 4 bundled DL SFs totally at most need occupy $$\left\lceil \frac{25 \times 4}{18} \right\rceil = 6$$

RBs. However, the number of scheduled UEs per TTI is far below 25. For example, at most 12 UEs are scheduled in each DL SF, it ideally only needs 12 HARQ indices per DL SF. Then within a window having 4 bundled DL SFs, it only needs $$\left\lceil \frac{12 \times 4}{18} \right\rceil = 3$$

RBs, which is only half of the maximum case. But since mapping relationship is fixedly specified in above formula, once one UE is allocated a RB with very large 4 times index, such as 96, it still needs to occupy the HARQ index at the end of PUCCH resource, even if there exist other idle HARQ indices at the beginning.

To optimize the case further, an improvement is used as following:

Assuming $H_0$ refers to an index calculated by using $$\left\lfloor \frac{RB_{idx}}{P_{RBG}} \right\rfloor \times K,$$

where $RB_{idx}$ is an index of the first allocated RB.

Assuming $H_1$ refers to an index calculated by using $$\left\lfloor \frac{RB_{idx}}{P_{RBG}} \right\rfloor \times K,$$

where $RB_{idx}$ an index of the first is allocated RB at the RBG boundary (integral times of $P_{RBG}$). Clearly, $H_0 <= H_1$.

If there is an idle HARQ index $H_r$ meeting a condition of $H_r \in [H_0 \sim H_0+7]$, wherein $H_0 < H_r < H_1$, $H_r$ is chosen with offset set to $H_r - H_0$ If there is no such an idle HARQ index $H_r$, $H_1$ is chosen with offset set to ZERO.

In this way, the UE can be allocated with a HARQ index as small as possible. In other word, the HARQ index space is compressed. Ideally, the HARQ index number can be exactly equal to the number of actually scheduled UEs, without wasting any index. Then, the minimum number of RBs is occupied for PUCCH HARQ feedback. Accordingly, more RBs can be used for UL data transmission.

Further Optimization for CFI=1 Case

From previous description, it can be seen that for CFI=2/3 cases, the present disclosure can provide higher PUCCH resource efficiency (25 indices per DL SF) than the existing standard (53/88 indices per DL SF). However, for CFI=1 case, the existing standard only specifies 20 CCEs, corresponding to 20 HARQ indices, which means that the maximum number of scheduled UEs per TTI has to be also below 20, so 25 indices per DL SF is redundant. To decrease such redundancy, the new idea can be further optimized for CFI=1 case.

Figure 7:
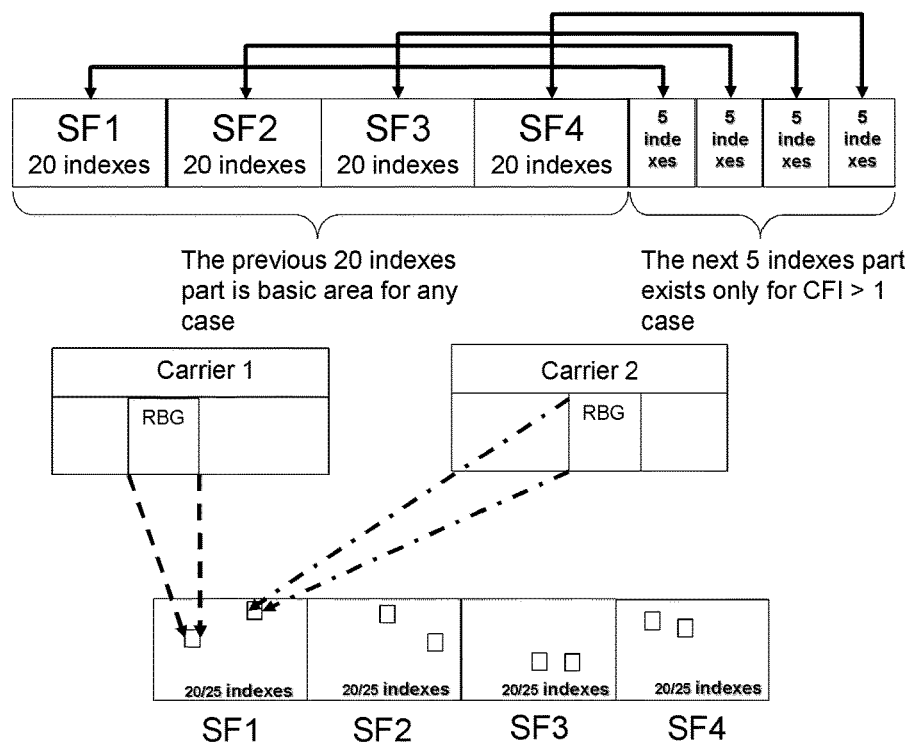
FIG. 7 illustrates the overall HARQ index pattern for TDD bundled DL SFs.

For CFI=2/3 cases, an aggregation size of RB corresponding a HARQ index is set same as RBG size. However for CFI=1, the aggregation size of RB is fixed to 5. FIG. 7 illustrates the overall HARQ index pattern for TDD bundled DL SFs (TDD Configuration 2). As shown in FIG. 7, the first part is a basic area including 20 indices for each DL SF, which is followed by an optional area including 5 indices for each DL SF On one hand, if all bundled DL SFs adopt CFI=1, RB aggregation size corresponding to each HARQ index is fixed to 5, and at most 20 indices are needed. So, only the basic area exits in PUCCH logic space. In this way, the number of HARQ indices per each DL SF has been successfully compressed from 25 to 20.

On the other hand, if any DL SF within bundled ones adopts CFI>1, RB aggregation size corresponding to each HARQ index is set to $P_{RBG}$, and at most 25 indices are needed. Then, an optional part may be appended into the basic part, and there are a total of 25*4=100 HARQ indices in PUCCH logic space, which is much smaller than 53*4=212 (CFI=2) or 88*4=352 (CFI=3) indices in existing standard.

Support for Carrier Aggregation (CA)

Figure 8:
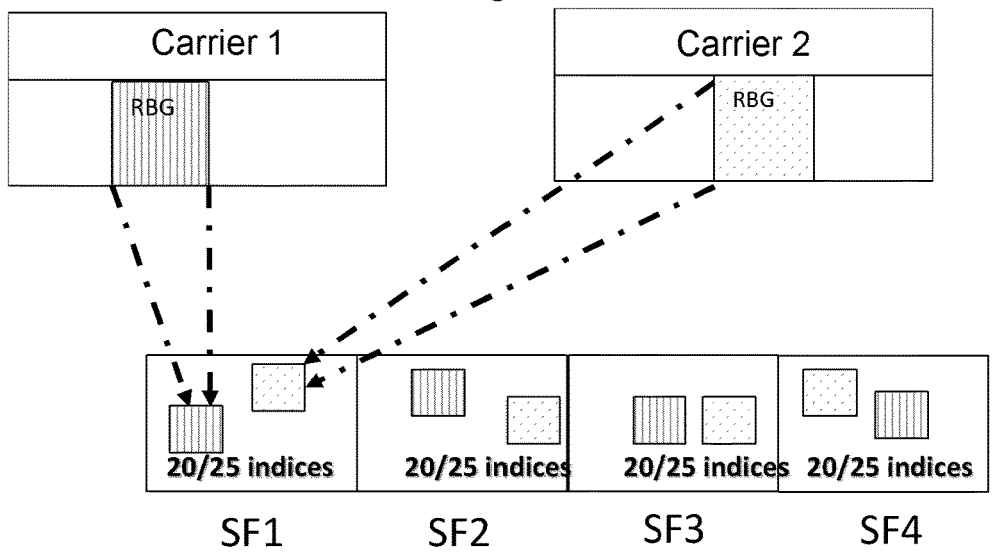
FIG. 8 illustrates PUCCH 1b/CS at primary carrier.

For multiple carriers CA (M>2), PUCCH format 3 is adopted, which carries CA HARQ feedbacks in a complete separate PUCCH area from format 1a/1b. PUCCH format 1b/CS is adopted for HARQ feedbacks of 2-carriers CA, in which the present disclosure can be also applied. Unlike the existing standard which statically allocates a maximum of 4 HARQ indices together with 2 HARQ indices calculated from CCE starting index at primary carrier, the present disclosure can completely separate a HARQ index for a primary carrier from that for a secondary carrier, as shown in FIG. 8, which illustrates PUCCH 1b/CS at primary carrier.

Within the overall PUCCH logic space at a primary carrier, there is a specific area with 20/25 indices for each DL SF, in which a HARQ index for each carrier is independently calculated according to its respective RB index at a corresponding carrier just like what done in non-CA scheduling. In this way, 2 independent HARQ indices are available for HARQ feedbacks at respective carriers. However, since the CA scheduling is performed independently at 2 carriers, one UE may be allocated with the same RB at 2 carriers, which will result in collision at same HARQ index. To resolve the collision issue, the offset mechanism is used just like what done in DL MU-MIMO. As long as an idle HARQ index can be found from 8 consecutive indices range, the collision issue can be resolved. Otherwise, the allocated RB at secondary carrier needs to be adjusted with coordination across multiple carriers to avoid collision. Considering all carriers scheduling are done within one eNB, such coordination of RB allocation among carriers is highly probably implemented just like DL-Coordinated Multi-Point (COMP).

Figure 9:
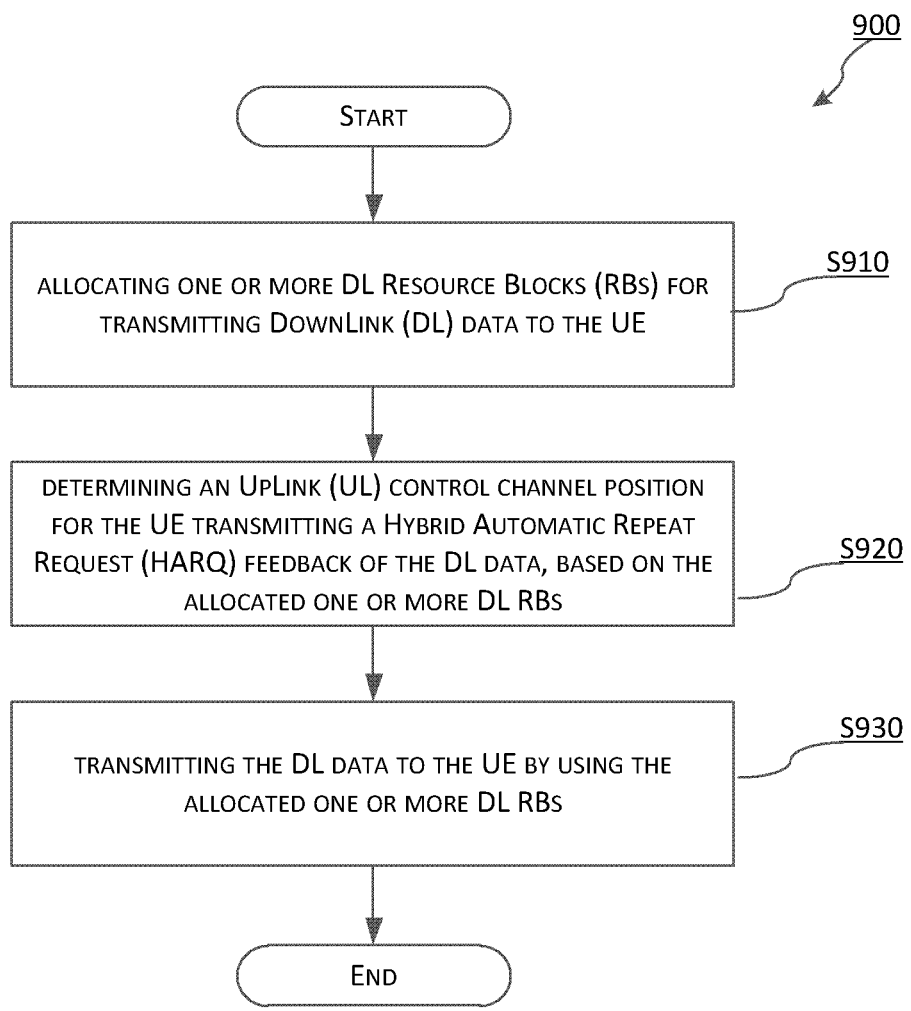
FIG. 9 shows a flowchart of a method 900 used in a BS for scheduling a UE according to the present disclosure.

FIG. 9 shows a flowchart of a method 900 used in a BS for scheduling a UE according to the present disclosure.

At step S910, the BS allocates one or more DL RBs for transmitting DL data to the UE.

At step S920, the BS determines an UL control channel position for the UE transmitting a HARQ feedback of the DL data, based on the allocated one or more DL RBs. For example, the UL control channel position may be indicated by a PUCCH HARQ index.

The UL control channel position may be determined based on the above formula (1):

$$HARQ_{idx} = \left\lfloor \frac{RB_{idx}}{P_{RBG}} \right\rfloor \times K + \text{offset},$$

wherein $HARQ_{idx}$ indicates an index of the UL control channel position, $P_{RBG}$ represents the number of RBs forming a Resource Block Group (RBG), $RB_{idx}$ indicates an index of a RB in the allocated one or more DL RBs, $\lfloor * \rfloor$ represents a floor operator, K is the number of UL control channel positions corresponding to one RBG, and offset denotes an offset of $HARQ_{idx}$ including a first offset.

For example, the BS may determine a preliminary $HARQ_{idx}$ based on $$HARQ_{idx} = \left\lfloor \frac{RB_{idx}}{P_{RBG}} \right\rfloor \times K,$$

and then determine whether the preliminary $HARQ_{idx}$ has been occupied by other UEs or not. If no, the preliminary $HARQ_{idx}$ may be taken as the final $HARQ_{idx}$, that is offset is zero. Otherwise, the BS may finds another HARQ feedback position available for the UE and determines an offset between the another HARQ feedback position and the preliminary $HARQ_{idx}$.

At step S930, the BS transmits the DL data to the UE by using the allocated one or more DL RBs.

Optionally, the method 900 further includes steps of setting a DL RB resource allocation scheme for the DL data; and setting $RB_{idx}$ and the first offset based on the DL RB resource allocation scheme; and transmitting $RB_{idx}$ and the first offset to the UE in DCI. For example, the DL RB resource scheme may be Type 0, Type 1, or Type 2, etc., which depends on a DCI mode, e.g., DCI 2, DCI 2B, DCI 2C, and the like. Then, step S910 may be performed based on the DL RB resource scheme. That is, the BS may allocate the one or more DL RBs for transmitting the DL data based on the set DL RB resource scheme.

In an implementation, the DL RB resource allocation scheme is Type 0. In this implementation, the BS may set $PRB_{idx}$ as an index of a first RB in the assigned RBs, and set the first offset as zero.

In another implementation, the DL RB resource allocation scheme is Type 1. If the number of the allocated one or more DL RBs is larger than or equal to $P_{RBG}$, the BS may set $RB_{idx}$ as an index of a first RB among one or more of the one or more DL RBs allocated to the UE with indices as integer times of $P_{RBG}$, and set the first offset as zero. For example, as shown in FIG. 3, taking $P_{RBG}$ as 4, if the BS allocates five RBs to the UE by setting five '1' in the 22-bit field, e.g., RB 12, RB 15, RB 16, RB 20, and RB 21 (RB 12, RB 16 and RB 20 are all integer times of 4), then $RB_{idx}$ is set as an index of RB 12 as RB 12 is the first one among RB 12, RB 16 and RB 20, which have with indices as integer times of $P_{RBG}$.

If the number of the allocated one or more DL RBs is smaller than or equal to $P_{RBG}$, $RB_{idx}$ is set as an index of a first RB among the one or more DL RBs allocated to the UE, and the first offset is set as a value indicated by offset bits at either end of a RB resources allocation field in the received DCI. For example, the RB resource allocation field in the received DCI may refer to the 22-bit field as shown in FIG. 3, and the offset bits correspond to the highest three bits in the 22-bit field.

In a further implementation, the DL RB resource allocation scheme is Type 2. If the number of the allocated one or more DL RBs is larger than or equal to $P_{RBG}$, the BS may set $RB_{idx}$ as an index of a first RB among one or more of the one or more DL RBs allocated to the UE with indices as integer times of $P_{RBG}$, and set the first offset as zero. For example, taking $P_{RBG}$ as 4, the BS allocates five RBs to the UE with RB 12 as a starting point, i.e., RB 12, RB 13, RB 14, RB 15, and RB 16 are allocated to the UE (RB 12 and RB 16 are both integer times of 4). In this case, the BS sets $RB_{idx}$ as an index of RB 12 as RB 12 is the first RB among RB 12 and RB 16, which have with indices as integer times of $P_{RBG}$.

If the number of the allocated one or more DL RBs is smaller than or equal to $P_{RBG}$, $RB_{idx}$ is set as an index of a first RB among the one or more DL RBs allocated to the UE, and the first offset is set as a value indicated by a RIV in the receive DCI in an unused value range. As shown in FIG. 5, the BS may set not only $PRB_{idx}$ and the number of the one or more DL RBs allocated to the UE, but only the first offset, in the RIV.

For example, if the BS allocates three continuous RBs (VRBs) to UE 2 for transmitting the DL data, and an index of the first RB is 87 (considering 100 RB in total). According to $$HARQ_{idx} = \left\lfloor \frac{RB_{idx}}{P_{RBG}} \right\rfloor \times K \ (K = 1),$$

it may be calculated that $HARQ_{idx}$ is 21, i.e., a HARQ feedback position indexed as $HARQ_{idx21}$. However, $HARQ_{idx21}$ has been allocated to UE 2, which has been assigned with RB 84. In this case, the BS needs to find an available HARQ feedback position for UE 2. For example, if the BS finds that $HARQ_{idx23}$ is available, then the BS may add an offset of 2 to allocate $HARQ_{idx23}$+offset to UE 2. In this case, a value indicated by the RIV should be 5635. That is, the BS may set the RIV as a value of 5635 to indicate $PRB_{idx}$, the number of the one or more DL RBs allocated to the UE, and the first offset, to the UE.

In yet another implementation, when the DCI is DCI 2B/2C for Multi-User Multi-Input Multi-Output (MU-MIMO), the BS may further set a second offset in a codeword in DCI 2B/2C, which is not used in transmitting the DL data. In this case, offset in the formula (1) is equal to the first offset plus the second offset. For example, the second offset may be set in a disabled codeword, e.g., CW1 as shown in FIG. 6.

According to the above embodiment, the present disclosure maps a HARQ feedback position to a RB index instead of a CCE index, i.e., to inform the UE of the HARQ feedback position via the RB index, thereby eliminating HARQ index confliction between dynamic scheduling and SPS, while improving PUCCH resource usage efficiency.

Figure 10:
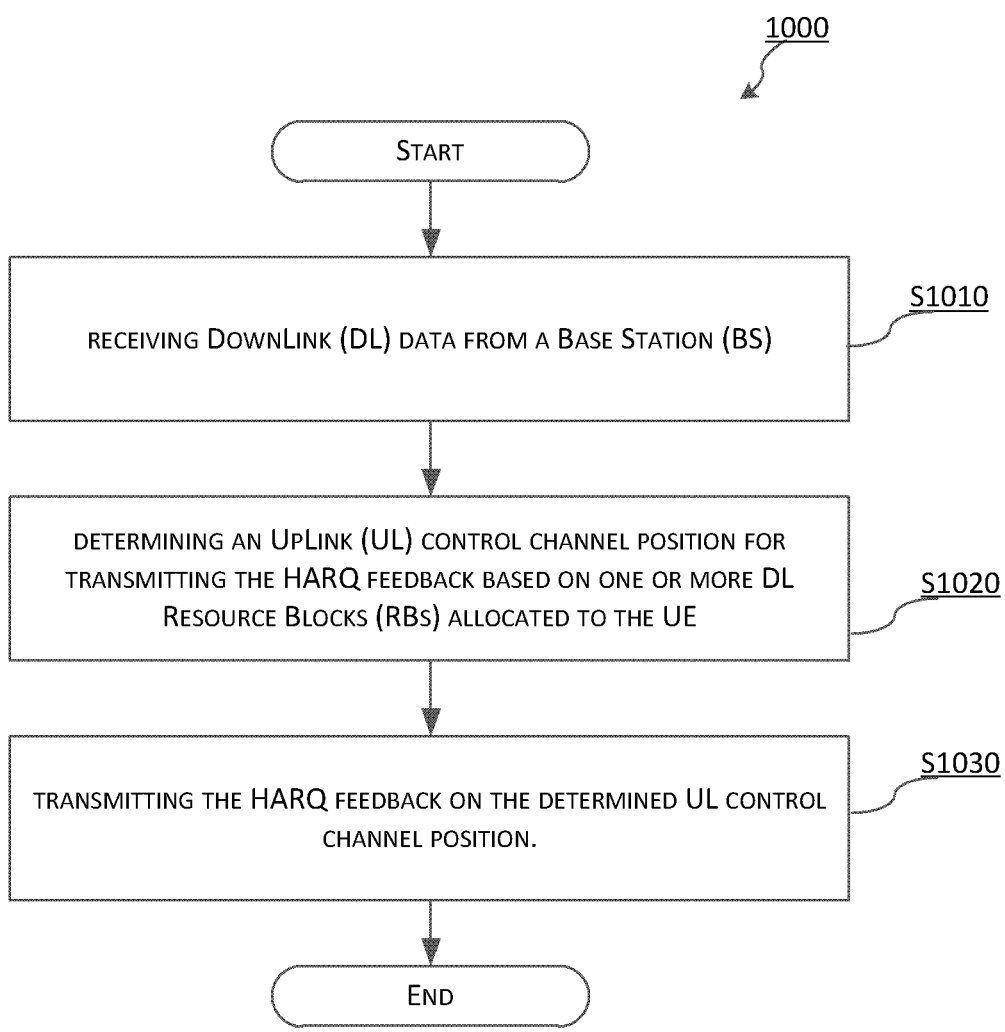
FIG. 10 shows a flowchart of a method 1000 used in a UE for transmitting a HARQ feedback according to the present disclosure.

FIG. 10 shows a flowchart of a method 1000 used in a UE for transmitting a HARQ feedback according to the present disclosure.

At step S1010, the UE receives DL data from a BS.

At step S1020, the UE determines an UL control channel position for transmitting the HARQ feedback based on one or more DL RBs allocated to the UE. For example, the UL control channel position may be indicated by a PUCCH HARQ index.

The UL control channel position may be determined based on the formula (1):

$$HARQ_{idx} = \left\lfloor \frac{RB_{idx}}{P_{RBG}} \right\rfloor \times K + \text{offset},$$

wherein $HARQ_{idx}$ indicates an index of the UL control channel position, $P_{RBG}$ represents the number of RBs forming a RBG, $RB_{idx}$ indicates an index of a RB in the one or more DL RBs allocated to the UE, $\lfloor * \rfloor$ represents a floor operator, K is the number of UL control channel positions corresponding to one RBG, and offset denotes an offset of $HARQ_{idx}$ including a first offset. For example, when there are 100 RBs in total, $P_{RBG}$ may be 4.

At step S1030, the UE transmits the HARQ feedback on the determined UL control channel position.

Optionally, the method 1000 further includes steps of receiving DCI from the BS; determining a DL RB resource allocation scheme for the DL data from the received DCI; and determining $RB_{idx}$, and the first offset based on the DL RB resource allocation scheme. For example, the DL RB resource scheme may be Type 0, Type 1, or Type 2, etc., and the UE may determine the DL RB resource allocation scheme based on a DCI mode e.g., DCI 2, DCI 2B, DCI 2C, and the like.

In an implementation, when the DL RB resource allocation scheme is determined as Type 0, determining $RB_{idx}$, and the first offset based on the DL RB resource allocation scheme comprises: determining $RB_{idx}$ as an index of a first RB in the assigned RBs, and determining the first offset as zero. For example, when the DL RB resource allocation scheme is Type 0, the UE may determine the assigned RBs from the 25 bits in the DCI as shown in FIG. 2, and then determines the index of the first RB in the assigned RBs.

In another implementation, when the DL RB resource allocation scheme is determined as Type 1, the method 1000 further includes steps of: determining the number of the one or more DL RBs allocated to the UE based on a RB resource allocation field in the received DCI by excluding offset bits at either end of the RB resources allocation field from the RB resource allocation field; and comparing the number of the one or more DL RBs allocated to the UE with $P_{RBG}$. For example, the RB resource allocation field in the received DCI may refer to the 22-bit field as shown in FIG. 3, and the offset bits correspond to the highest three bits in the 22-bit field. The UE may determine the number of the one or more DL RBs allocated to the UE by identifying, e.g., the number of '1' occurring in the 22-bit field.

If the number of the one or more DL RBs allocated to the UE is larger than or equal to $P_{RBG}$, determining $RB_{idx}$, and the first offset based on the DL RB resource allocation scheme comprises: determining $RB_{idx}$ as an index of a first RB among one or more of the one or more DL RBs allocated to the UE with indices as integer times of $P_{RBG}$, and determining the first offset as zero. For example, taking $P_{RBG}$ as 4, if the UE identifies five '1' in the 22-bit field, e.g., RB 12, RB 15, RB 16, RB 20, and RB 21 (RB 12, RB 16 and RB 20 are all integer times of 4), then an index of RB 12 is taken as $RB_{idx}$ as RB 12 is the first RB among RB 12, RB 16 and RB 20.

If the number of the one or more DL RBs allocated to the UE is smaller than $P_{RBG}$, determining $RB_{idx}$, and the first offset based on the DL RB resource allocation scheme comprises steps of: determining $RB_{idx}$ as an index of a first RB among the one or more DL RBs allocated to the UE, and determining the first offset as a value indicated by the offset bits. For example, the offset bits may be the highest three bits as shown in FIG. 3.

In a further implementation, when the DL RB resource allocation scheme is determined as Type 2, the method 1000 further comprises steps of: determining the number of RBs allocated to the UE based on a RIV in the receive DCI; and comparing the number of RBs allocated to the UE with $P_{RBG}$.

As shown in FIG. 5, according to the RIV, the UE may identify not only $RB_{idx}$ and the number of the one or more DL RBs allocated to the UE, but only the first offset.

To be specific, if the number of the one or more DL RBs allocated to the UE is larger than or equal to $P_{RBG}$, determining $RB_{idx}$, and the first offset based on the DL RB resource allocation scheme comprises steps of: determining $RB_{idx}$ as an index of a first RB among one or more of the one or more DL RBs allocated to the UE with indices as integer times of $P_{RBG}$, and determining the first offset as zero.

For example, if the RIV indicates a value 320, according to FIG. 5, the UE may determine that the first offset is zero, i.e., there is no offset. Moreover, the UE may determine an index of a starting RB of the one or more DL RBs allocated to the UE as specified in the existing 3GPP specification, and the detailed thereof will be omitted here. Then, an index of a first RB among one or more of the one or more DL RBs allocated to the UE with indices as integer times of $P_{RBG}$ may serve as $PRB_{idx}$. For example, taking $P_{RBG}$ as 4, if the UE determines that a starting RB of the one or more DL RBs allocated to the UE is RB 12 and the one or more DL RBs allocated to the UE is 5, i.e., RB 12, RB 13, RB 14, RB 15, and RB 16 are allocated to the UE (RB 12 and RB 16 are both integer times of 4). In this case, an index of RB 12 is taken as $RB_{idx}$ because RB 12 is the first RB among RB 12 and RB 16.

If the number of the one or more DL RBs allocated to the UE is smaller than or equal to $P_{RBG}$, determining $RB_{idx}$ and the first offset based on the DL RB resource allocation scheme comprises steps of: determining $RB_{idx}$ as an index of a first RB among the one or more DL RBs allocated to the UE, and determining the first offset as a value indicated by the RIV in an unused value range.

For example, if the RIV indicates a value 5635, the UE may determine offset as 2 according to:

$$\text{offset} = \begin{cases} 0, & 0 \leq RIV < 298 \\ NA, & 298 \leq RIV < 5050 \\ \frac{RIV - 5050}{298} + 1, & 5050 \leq RIV < 7136 \end{cases}.$$

In a yet further implementation, when the DCI is DCI 2B/2C for Multi-User Multi-Input Multi-Output (MU-MIMO), the UE may further determines a second offset from a codeword in DCI 2B/2C, which is not used in transmitting the DL data. In this case, offset in the formula (1) is equal to the first offset plus the second offset. For example, the second offset may be carried in a disabled codeword, e.g., CW1 as shown in FIG. 6.

Figure 11:
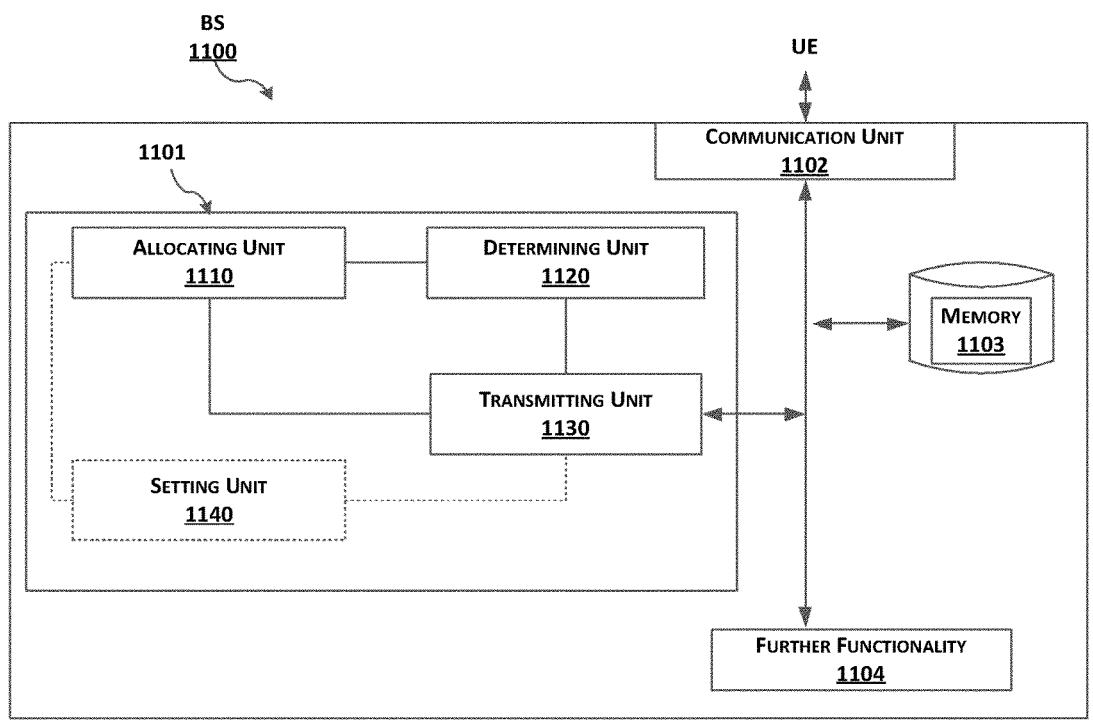
FIG. 11 is a schematic block diagram of a BS 1100 for scheduling a UE according to the present disclosure.

FIG. 11 is a schematic block diagram of a BS 1100 for scheduling a UE according to the present disclosure.

The part of BS 1100 which is most affected by the adaptation to the herein described method, e.g., the method 900, is illustrated as an arrangement 1101, surrounded by a dashed line. The BS 1100 could be e.g. an eNB, or a NodeB, depending on in which type of communication system it is operable, e.g., LTE-A-type systems and 5G systems, which use Orthogonal Frequency Division Multiplexing (OFDM) and HARQ feedback mechanism. The BS 1100 and arrangement 1101 may be further configured to communicate with other entities via a communication unit 1102 which may be regarded as part of the arrangement 1101. The communication unit 1102 comprises means for wireless communication, and may comprise means for, e.g., wired communication. The arrangement 1101 or BS 1100 may further comprise other functional units 1104, such as functional units providing regular BS functions, and may further comprise one or more storage units (memories) 1103.

The arrangement 1101 may be implemented, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 9. The arrangement part of the BS 1100 may be implemented and/or described as follows.

Referring to FIG. 11, BS 1100 includes an allocating unit 1110, a determining unit 1120, and a transmitting unit 1130.

The allocating unit 1110 is configured to allocate one or more DL RBs for transmitting DL data to the UE.

The determining unit 1120 is configured to determine an UL control channel position for the UE transmitting a HARQ feedback of the DL data, based on the allocated one or more DL RBs. For example, the UL control channel position may be indicated by a PUCCH HARQ index. The UL control channel position may be determined based on the formula (1).

For example, the determining unit 1120 may determine a preliminary $HARQ_{idx}$ based on $$HARQ_{idx} = \left\lfloor \frac{RB_{idx}}{P_{RBG}} \right\rfloor \times K,$$

and then determine whether the preliminary $HARQ_{idx}$ has been occupied by other UEs or not. If no, the preliminary $HARQ_{idx}$ may be taken as the final $HARQ_{idx}$, that is offset is zero. Otherwise, the determining unit 1120 finds another HARQ feedback position available for the UE and determines an offset between the another HARQ feedback position and the preliminary $HARQ_{idx}$.

The transmitting unit 1130 is configured to transmit the DL data to the UE by using the allocated one or more DL RBs.

Optionally, the BS 1100 may further include a setting unit 1140. The setting unit 1140 is configured to set a DL RB resource allocation scheme for the DL data, and to set $RB_{idx}$ and the first offset based on the DL RB resource allocation scheme. In this case, the transmitting unit 1130 is further configured to transmit $RB_{idx}$ and the first offset to the UE in DCI. For example, the DL RB resource scheme may be Type 0, Type 1, or Type 2, etc., which depends on a DCI mode, e.g., DCI 2, DCI 2B, DCI 2C, and the like. Then, the allocation unit 1110 may allocate the one or more DL RBs based on the DL RB resource scheme.

In an implementation, when the DL RB resource allocation scheme is Type 0, $RB_{idx}$ is set as an index of a first RB in the assigned RBs, and the first offset is set as zero.

In another implementation, the DL RB resource allocation scheme is Type 1. In this implementation, if the number of the allocated one or more DL RBs is larger than or equal to $P_{RBG}$, $RB_{idx}$ is set as an index of a first RB among one or more of the one or more DL RBs allocated to the UE with indices as integer times of $P_{RBG}$, and the first offset is set as zero. If the number of the allocated one or more DL RBs is smaller than or equal to $P_{RBG}$, $RB_{idx}$ is set as an index of a first RB among the one or more DL RBs allocated to the UE, and the first offset is set as a value indicated by offset bits at either end of a RB resources allocation field in the received DCI, as shown in FIG. 3.

In yet another implementation, the DL RB resource allocation scheme is Type 2. In this implementation, if the number of the allocated one or more DL RBs is larger than or equal to $P_{RBG}$, $RB_{idx}$ is set as an index of a first RB among one or more of the one or more DL RBs allocated to the UE with indices as integer times of $P_{RBG}$, and the first offset is set as zero. If the number of the allocated one or more DL RBs is smaller than or equal to $P_{RBG}$, $RB_{idx}$ is set as an index of a first RB among the one or more DL RBs allocated to the UE, and the first offset is set as a value indicated by a RIV in the receive DCI in an unused value range, as shown in FIG. 6.

In a further implementation, when the DCI is DCI 2B/2C for MU-MIMO, offset in the formula (1) is equal to the first offset plus a second offset carried in a codeword in DCI 2B/2C, which is not used in transmitting the DL data.

It should be noted that two or more different units in this disclosure may be logically or physically combined. For example, the allocation unit 1110 and the determining unit 1120 may be combined as one single unit.

Figure 12:
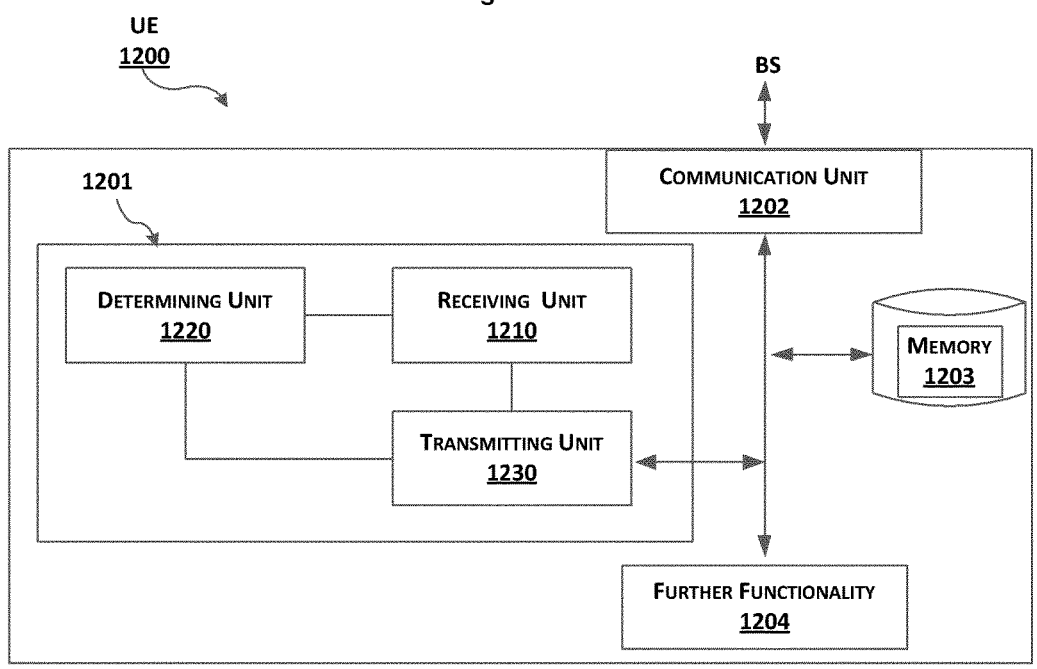
FIG. 12 is a schematic block diagram of a UE 1200 for transmitting a HARQ feedback according to the present disclosure.

FIG. 12 is a schematic block diagram of a UE 1200 for transmitting a HARQ feedback according to the present disclosure.

The part of UE 1200 which is most affected by the adaptation to the herein described method, e.g., the method 1000, is illustrated as an arrangement 1201, surrounded by a dashed line. The UE 1200 could be, e.g., a mobile terminal, depending on in which type of communication system it is operable, e.g., LTE-A-type systems and 5G systems, which use Orthogonal Frequency Division Multiplexing (OFDM) and HARQ feedback mechanism. The UE 1200 and arrangement 1201 may be further configured to communicate with other entities via a communication unit 1202 which may be regarded as part of the arrangement 1201. The communication unit 1202 comprises means for wireless communication. The arrangement 1201 or UE 1200 may further comprise other functional units 1204, such as functional units providing regular UE functions, and may further comprise one or more storage units (memories) 1203.

The arrangement 1201 could be implemented, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 10. The arrangement part of the UE 1200 may be implemented and/or described as follows.

Referring to FIG. 12, UE 1200 includes a receiving unit 1210, a determining unit 1220, and a transmitting unit 1230.

The receiving unit 1210 is configured to receive DL data from a BS.

The determining unit 1220 is configured to determine an UL control channel position for transmitting the HARQ feedback based on one or more DL RBs allocated to the UE. For example, the UL control channel position may be indicated by a PUCCH HARQ index. The UL control channel position may be determined based on the formula (1).

The transmitting unit 1230 is configured to transmit the HARQ feedback on the determined UL control channel position.

Optionally, the receiving unit 1210 is further configured to receive DCI from the BS. The determining unit 1220 is further configured to determine a DL RB resource allocation scheme for the DL data from the received DCI, and to determine $PRB_{idx}$, and the first offset based on the DL RB resource allocation scheme.

In an implementation, when the DL RB resource allocation scheme is determined as Type 0, the determining unit 1220 is configured to determine $PRB_{idx}$ as an index of a first RB in the assigned RBs and to determine the first offset as zero.

In another implementation, when the DL RB resource allocation scheme is determined as Type 1, the determining unit 1220 is further configured to determine the number of the one or more DL RBs allocated to the UE based on a RB resource allocation field in the received DCI by excluding offset bits at either end of the RB resources allocation field from the RB resource allocation field. In this implementation, the UE 1200 optionally includes a first comparing unit (not shown). The first comparing unit is configured to compare the number of the one or more DL RBs allocated to the UE with $P_{RBG}$. If the number of the one or more DL RBs allocated to the UE is larger than or equal to $P_{RBG}$, the determining unit 1220 determines $RB_{idx}$ as an index of a first RB among one or more of the one or more DL RBs allocated to the UE with indices as integer times of $P_{RBG}$ and to determine the first offset as zero. If the number of the one or more DL RBs allocated to the UE is smaller than $P_{RBG}$, the determining unit 1220 determines $RB_{idx}$ as an index of a first RB among the one or more DL RBs allocated to the UE and to determine the first offset as a value indicated by the offset bits, as shown in FIG. 3.

In yet another implementation, when the DL RB resource allocation scheme is determined as Type 2, the determining unit 1220 is further configured to determine the number of RBs allocated to the UE based on a RIV in the receive DCI. In this implementation, the UE 1220 optionally includes a second comparing unit (not shown). The second comparing unit is configured to compare the number of RBs allocated to the UE with $P_{RBG}$. If the number of the one or more DL RBs allocated to the UE is larger than or equal to $P_{RBG}$, the determining unit 1220 determines $RB_{idx}$ as an index of a first RB among one or more of the one or more DL RBs allocated to the UE with indices as integer times of $P_{RBG}$ and to determine the first offset as zero. If the number of the one or more DL RBs allocated to the UE is smaller than or equal to $P_{RBG}$, the determining unit 1220 determines $RB_{idx}$ as an index of a first RB among the one or more DL RBs allocated to the UE and to determine the first offset as a value indicated by the RIV, as shown in FIG. 6.

In a further implementation, when the DCI is DCI 2B/2C for MU-MIMO, offset in the formula (1) is equal to the first offset plus a second offset carried in a codeword in DCI 2B/2C, which is not used in transmitting the DL data.

It should be noted that two or more different units in this disclosure may be logically or physically combined. For example, the receiving unit 1210 and the transmitting unit 1230 may be combined as one single unit.

Figure 13:
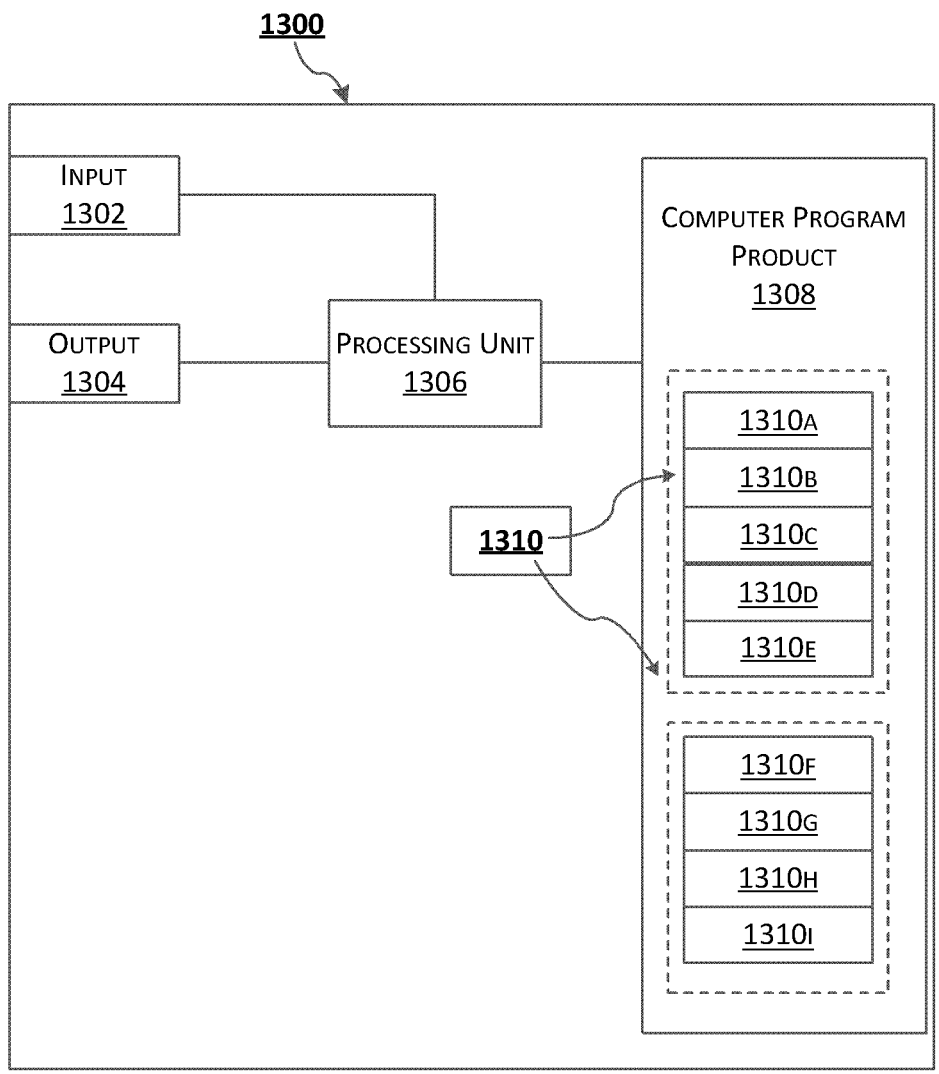
FIG. 13 schematically shows an embodiment of an arrangement 1300 which may be used in the BS 1100 or the UE 1200 according to the present disclosure.

FIG. 13 schematically shows an embodiment of an arrangement 1300 which may be used in the BS 1100 or the UE 1200 according to the present disclosure.

Comprised in the arrangement 1300 are here a processing unit 1306, e.g., with a Digital Signal Processor (DSP). The processing unit 1306 may be a single unit or a plurality of units to perform different actions of procedures described herein. The arrangement 1300 may also comprise an input unit 1302 or receiving signals from other entities, and an output unit 1304 for providing signal(s) to other entities. The input unit and the output unit may be arranged as an integrated entity or as illustrated in the example of FIG. 11 or FIG. 12.

Furthermore, the arrangement 1300 may comprise at least one computer program product 1308 in the form of a non-volatile or volatile memory, e.g., an Electrically Erasable Programmable Read-Only Memory (EEPROM), a flash memory and a hard drive. The computer program product 1308 comprises a computer program 1310, which comprises code/computer readable instructions, which when executed by the processing unit 1306 in the arrangement 1300 causes the arrangement 1300 and/or the BS or the UE in which it is comprised to perform the actions, e.g., of the procedure described earlier in conjunction with FIG. 9 or FIG. 10.

The computer program 1310 may be configured as a computer program code structured in computer program modules 1310A-1310E or 1310F-1310I.

Hence, in an exemplifying embodiment when the arrangement 1300 is used in the BS 1100, the code in the computer program of the arrangement 1300 includes an allocating module 1310A, for allocating one or more DL RBs for transmitting DL data to the UE. The code in the computer program 1310 further includes a determining module 1310B, for determining an UL control channel position for the UE transmitting a HARQ feedback of the DL data, based on the allocated one or more DL RBs. The code in the computer program 1310 further includes a transmitting module 1310C, for the DL data to the UE by using the allocated one or more DL RBs. Optionally, the code in the computer program 1310 further includes a setting module 1310D, for setting a DL RB resource allocation scheme for the DL data, and to set $RB_{idx}$ and the first offset based on the DL RB resource allocation scheme. The code in the computer program 1310 may comprise further modules, illustrated as module 1310E, e.g. for controlling and performing other related procedures associated with BS's operations.

In another exemplifying embodiment when the arrangement 1300 is used in the UE 1200, the code in the computer program of the arrangement 1300 includes a receiving module 1310F, for receiving DL data from a BS. The code in the computer program further includes a determining module 1310G, for determining an UL control channel position for transmitting the HARQ feedback based on one or more DL RBs allocated to the UE. The code in the computer program further includes a transmitting unit 1310H, for transmitting the HARQ feedback on the determined UL control channel position. The code in the computer program 1310 may comprise further modules, illustrated as module 1310I, e.g. for controlling and performing other related procedures associated with UE's operations.

The computer program modules could essentially perform the actions of the flow illustrated in FIG. 9, to emulate the arrangement 1101 in the BS 1100, or the actions of the flow illustrated in FIG. 10, to emulate the arrangement 1201 in the UE 1200. In other words, when the different computer program modules are executed in the processing unit 1306, they may correspond, e.g., to the units 1110-1140 of FIG. 11 or to the units 1210-1230 of FIG. 12.

Although the code means in the embodiments disclosed above in conjunction with FIG. 13 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method used in a Base Station (BS) for scheduling a User Equipment (UE), the method comprising steps of:
   allocating one or more DL Resource Blocks (RBs) for transmitting Downlink (DL) data to the UE;
   determining an Uplink (UL) control channel position for the UE transmitting a Hybrid Automatic Repeat Request (HARQ) feedback of the DL data, based on the allocated one or more DL RBs;
   transmitting the DL data to the UE by using the allocated one or more DL RBs; and
   wherein the UL control channel position is determined based on:

$$HARQ_{idx} = \left\lfloor \frac{RB_{idx}}{P_{RBG}} \right\rfloor \times K + \text{offset}$$

wherein $HARQ_{idx}$ indicates an index of the UL control channel position, $P_{RBG}$ represents the number of RBs forming a Resource Block Group (RBG), $RB_{idx}$ indicates an index of a RB in the allocated one or more DL RBs, $\lfloor * \rfloor$ represents a floor operator, K is the number of UL control channel position corresponding to one RBG, and offset denotes an offset of $HARQ_{idx}$ including a first offset.

2. The method according to claim 1, wherein the method further comprises:
   setting a DL RB resource allocation scheme for the DL data; and
   setting $RB_{idx}$ and the first offset based on the DL RB resource allocation scheme; and
   transmitting $RB_{idx}$ and the first offset to the UE in Downlink Control Information (DCI).

3. The method according to claim 2,
   wherein the DL RB resource allocation scheme is Resource Allocation Type 0, in which the UE is assigned with RBs with a granularity of a RBG, and wherein $RB_{idx}$ is set as an index of a first RB in the assigned RBs, and the first offset is set as zero.

4. The method according to claim 2,
   wherein the DL RB resource allocation scheme is Resource Allocation Type 1, in which all DL RBs are divided into more than one subsets at a granularity of RBG, and the UE is only assigned with one or more RBs within one subset,
   wherein if the number of the allocated one or more DL RBs is larger than or equal to $P_{RBG}$, $RB_{idx}$ is set as an index of a first RB among one or more of the one or more DL RBs allocated to the UE with indices as integer times of $P_{RBG}$, and the first offset is set as zero; and
   wherein if the number of the allocated one or more DL RBs is smaller than or equal to $P_{RBG}$, $RB_{idx}$ is set as an index of a first RB among the one or more DL RBs allocated to the UE, and the first offset is set as a value indicated by offset bits at either end of a RB resources allocation field in the received DCI.

5. The method according to claim 2,
   wherein the DL RB resource allocation scheme is Resource Allocation Type 2, in which a segment of continuous RBs are allocated to the UE,
   wherein if the number of the allocated one or more DL RBs is larger than or equal to $P_{RBG}$, $RB_{idx}$ is set as an index of a first RB among one or more of the one or more DL RBs allocated to the UE with indices as integer times of $P_{RBG}$, and the first offset is set as zero; and
   wherein if the number of the allocated one or more DL RBs is smaller than or equal to $P_{RBG}$, $RB_{idx}$ is set as an index of a first RB among the one or more DL RBs allocated to the UE, and the first offset is set as a value indicated by a Resource Indicator Value (RIV) in the receive DCI in an unused value range.

6. A method used in a User Equipment (UE) for transmitting a Hybrid Automatic Repeat Request (HARQ) feedback, the method comprising steps of:
   receiving DownLink (DL) data from a Base Station (BS);
   determining an UpLink (UL) control channel position for transmitting the HARQ feedback based on one or more DL Resource Blocks (RBs) allocated to the UE;
   transmitting the HARQ feedback on the determined UL control channel position; and
   wherein the UL control channel position is determined based on:

$$HARQ_{idx} = \left\lfloor \frac{RB_{idx}}{P_{RBG}} \right\rfloor \times K + \text{offset,}$$

wherein $HARQ_{idx}$ indicates an index of the UL control channel position, $P_{RBG}$ represents the number of RBs forming a Resource Block Group (RBG), $RB_{idx}$ indicates an index of a RB in the one or more DL RBs allocated to the UE, $\lfloor * \rfloor$ represents a floor operator, K is the number of UL control channel positions corresponding to one RBG, and offset denoted an offset of $HARQ_{idx}$ including a first offset.

7. The method according to claim 6, wherein the method further comprises:
   receiving Downlink Control Information (DCI) from the BS;
   determining a DL RB resource allocation scheme for the DL data from the received DCI; and determining RB$_{idx}$, and the first offset based on the DL RB resource allocation scheme.

8. The method according to claim 7, wherein
when the DL RB resource allocation scheme is determined as Resource Allocation Type 0, in which the UE is assigned RBs with a granularity of a RBG, determining RB$_{idx}$, and the first offset based on the DL RB resource allocation scheme comprises: determining RB$_{idx}$ as an index of a first RB in the assigned RBs, and determining the first offset as zero.

9. The method according to claim 7, wherein
when the DL RB resource allocation scheme is determined as Resource Allocation Type 1, in which all DL RBs are divided into more than one subsets at a granularity of RBG, and the UE is only assigned with one or more RBs within one subset,
the method further comprises steps of:
determining the number of the one or more DL RBs allocated to the UE based on a RB resource allocation field in the received DCI by excluding offset bits at either end of the RB resources allocation field from the RB resource allocation field; and
comparing the number of the one or more DL RBs allocated to the UE with P$_{RBG}$,
wherein if the number of the one or more DL RBs allocated to the UE is larger than or equal to P$_{RBG}$, determining RB$_{idx}$, and the first offset based on the DL RB resource allocation scheme comprises: determining RB$_{idx}$ as an index of a first RB among one or more of the one or more DL RBs allocated to the UE with indices as integer times of P$_{RBG}$, and determining the first offset as zero; and
wherein if the number of the one or more DL RBs allocated to the UE is smaller than P$_{RBG}$, determining RB$_{idx}$, and the first offset based on the DL RB resource allocation scheme comprises steps of: determining RB$_{idx}$ as an index of a first RB among the one or more DL RBs allocated to the UE, and determining the first offset as a value indicated by the offset bits.

10. The method according to claim 7, wherein
when the DL RB resource allocation scheme is determined as Resource Allocation Type 2, in which a segment of continuous RBs are allocated to the UE,
the method further comprises:
determining the number of RBs allocated to the UE based on a Resource Indicator Value (RIV) in the receive DCI; and
comparing the number of RBs allocated to the UE with P$_{RBG}$,
wherein if the number of the one or more DL RBs allocated to the UE is larger than or equal to P$_{RBG}$, determining RB$_{idx}$, and the first offset based on the DL RB resource allocation scheme comprises steps of: determining RB$_{idx}$ as an index of a first RB among one or more of the one or more DL RBs allocated to the UE with indices as integer times of P$_{RBG}$, and determining the first offset as zero; and
wherein if the number of the one or more DL RBs allocated to the UE is smaller than or equal to P$_{RBG}$, determining PRB$_{idx}$ and the first offset based on the DL RB resource allocation scheme comprises steps of: determining PRB$_{idx}$ as an index of a first RB among the one or more DL RBs allocated to the UE, and determining the first offset as a value indicated by the RIV in an unused value range.

11. The method according to claim 7, wherein when the DCI is DCI 2B/2C for Multi-User Multi-Input Multi-Output (MU-MIMO), offset is equal to the first offset plus a second offset carried in a codeword in DCI 2B/2C, which is not used in transmitting the DL data.

12. A User Equipment (UE) for transmitting a Hybrid Automatic Repeat Request (HARQ) feedback, the UE comprising:
a receiver configured to receive DownLink (DL) data from a Base Station (BS);
one or more processors configured to determine an UpLink (UL) control channel position for transmitting the HARQ feedback based on one or more DL Resource Blocks (RBs) allocated to the UE;
a transmitter configured to transmit the HARQ feedback on the determined UL control channel position; and
wherein the one or more processors are configured to determine the UL control channel position based on:

$$HARQ_{idx} = \left\lfloor \frac{RB_{idx}}{P_{RBG}} \right\rfloor \times K + \text{offset},$$

wherein HARQ$_{idx}$ indicates an index of the UL control channel position, P$_{RBG}$ represents the number of RBs forming a Resource Block Group, RB$_{idx}$ indicates an index of a RB in the one or more DL RBs allocated to the UE, $\lfloor * \rfloor$ represents a floor operator, K is the number of UL control channel positions corresponding to one RBG, and offset denotes an offset of HARQ$_{idx}$ including a first offset.

13. The UE according to claim 12, wherein
the receiver is further configured to receive Downlink Control information (DCI) from the BS;
the one or more processors are further configured to determine a DL RB resource allocation scheme for the DL data from the received DCI; and
the one or more processors are further configured to determine PRB$_{idx}$, and the first offset based on the DL RB resource allocation scheme.

14. The UE according to claim 13, wherein
when the DL RB resource allocation scheme is determined as Resource Allocation Type 0, in which the UE is assigned RBs with a granularity of a RBG, and the one or more processors are configured to determine RB$_{idx}$ as an index of a first RB in the assigned RBs and to determine the first offset as zero.

15. The UE according to claim 13, wherein
when the DL RB resource allocation scheme is determined as Resource Allocation Type 1, in which all DL RBs are divided into more than one subsets at a granularity of RBG, and the UE is only assigned with one or more RBs within one subset,
the one or more processors are further configured to determine the number of the one or more DL RBs allocated to the UE based on a RB resource allocation field in the received DCI by excluding offset bits at either end of the RB resources allocation field from the RB resource allocation field,
wherein the one or more processors are configured to compare the number of the one or more DL RBs allocated to the UE with P$_{RBG}$,
wherein if the number of the one or more DL RBs allocated to the UE is larger than or equal to P$_{RBG}$, the one or more processors are further configured to determine RB$_{idx}$ as an index of a first RB among one or more of the one or more DL RBs allocated to the UE with indices as integer times of $P_{RBG}$ and to determine the first offset as zero; and wherein if the number of the one or more DL RBs allocated to the UE is smaller than $P_{RBG}$, the one or more processors are further configured to determine $RB_{idx}$ as an index of a first RB among the one or more DL RBs allocated to the UE and to determine the first offset as a value indicated by the offset bits.

16. The UE according to claim 13, wherein when the DL RB resource allocation scheme is determined as Resource Allocation Type 2, in which a segment of continuous RBs are allocated to the UE, the one or more processors are further configured to determine the number of RBs allocated to the UE based on a Resource Indicator Value (RIV) in the receive DCI, the one or more it processors are configured to compare the number of RBs allocated to the UE with $P_{RBG}$, wherein if the number of the one or more DL RBs allocated to the UE is larger than or equal to $P_{RBG}$, the one or more processors are further configured to determine $RB_{idx}$ as an index of a first RB among one or more of the one or more DL RBs allocated to the UE with indices as integer times of $P_{RBG}$ and to determine the first offset as zero; and wherein if the number of the one or more DL RBs allocated to the UE is smaller than or equal to the $P_{RBG}$, the one or more processors are further configured to determine $RB_{idx}$ as an index of a first RB among the one or more DL RBs allocated to the UE and to determine the first offset as a value indicated by the RIV.

17. The UE according to claim 13, wherein when the DCI is DCI 2B/2C for Multi-User Multi-Input Multi-Output (MU-MIMO), offset is equal to the first offset plus a second offset carried in a codeword in DCI 2B/2C, which is not used in transmitting the DL data.

* * * * *